United States Patent [19]

Reytblatt

[11] 4,286,843

[45] Sep. 1, 1981

[54] POLARISCOPE AND FILTER THEREFOR

[76] Inventor: Zinovy V. Reytblatt, 3550 N. Lake Shore Dr., Chicago, Ill. 60657

[21] Appl. No.: 38,575

[22] Filed: May 14, 1979

[51] Int. Cl.$^3$ .......................... G02B 5/30; G02B 27/28
[52] U.S. Cl. .................................. 350/396; 350/408; 356/33; 356/35
[58] Field of Search .................................. 356/33–35, 356/365; 350/148, 153, 396, 408; 73/762, 800

[56] References Cited

U.S. PATENT DOCUMENTS

| | | | |
|---|---|---|---|
| 2,309,626 | 2/1943 | Conrad . | |
| 2,493,200 | 1/1950 | Land . | |
| 2,720,553 | 10/1955 | Toulon | 350/148 |
| 3,054,204 | 9/1962 | Yates | 350/153 |
| 3,544,193 | 12/1970 | Laput | 350/148 |
| 4,158,506 | 6/1979 | Collett | 356/365 |
| 4,171,908 | 10/1979 | Robert et al. | 356/33 |

OTHER PUBLICATIONS

Redner, S., "New Automatic Polariscope System", Exp. Mech. (U.S.A.), vol. 14 #12, 12-1974, pp. 486–491.

Zandman et al., "Photoelastic Coatings", Joint Publication, Iowa State U. Press & Soc. For Exp. Stress Analysis, pp. 7–30.

Primary Examiner—William H. Punter
Attorney, Agent, or Firm—Vogel, Dithmar, Stotland, Stratman & Levy

[57] ABSTRACT

The filter comprises a multiplicity of light polarizing elements which polarize light in a plurality of planes, and a multiplicity of filtering means associated with the light polarizing elements. In a polariscope, light is directed from a source through such a filter to the specimen to be analyzed. Light passed through the specimen once or twice is coupled through another such filter termed an analyzer. In certain embodiments, the polarizer and the analyzer are combined. Patterns representing the stress in the specimen are produced. The pattern includes isochromatics and a number of isoclinics.

29 Claims, 27 Drawing Figures

U.S. Patent  Sep. 1, 1981  Sheet 1 of 5  4,286,843
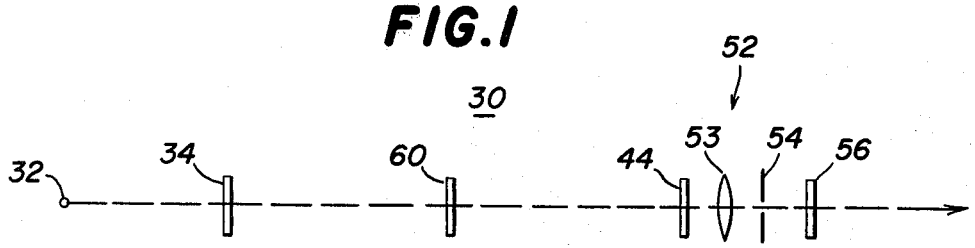
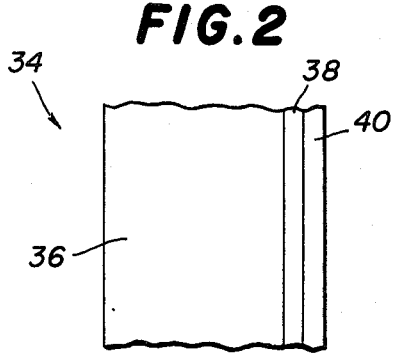
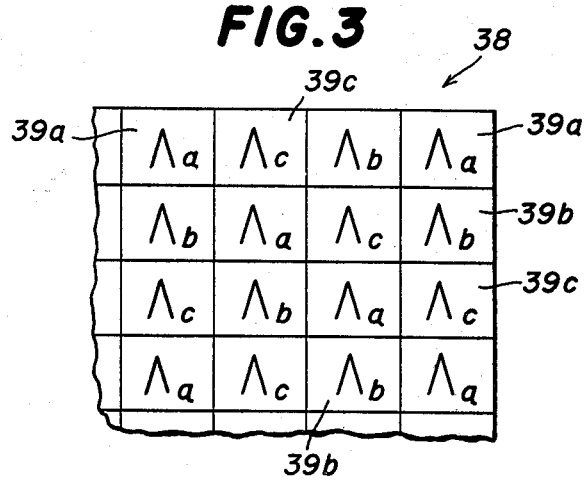
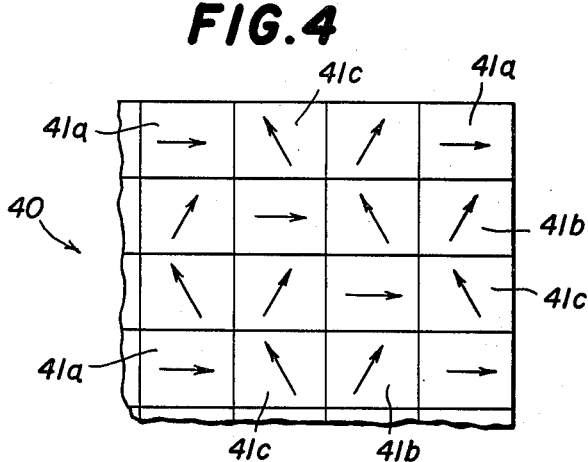
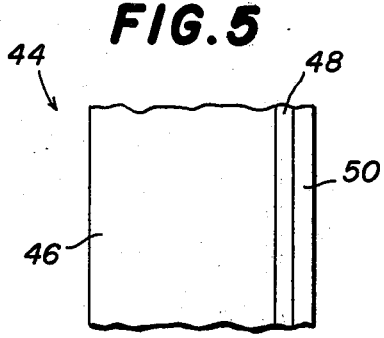
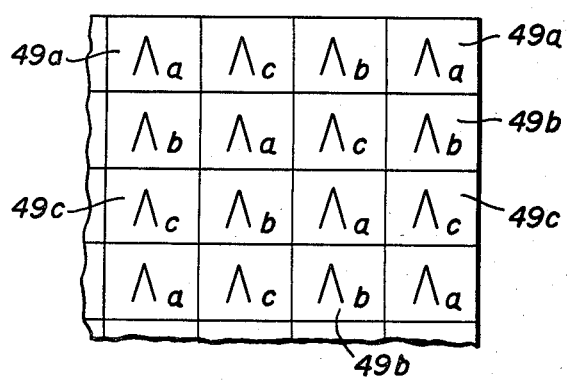
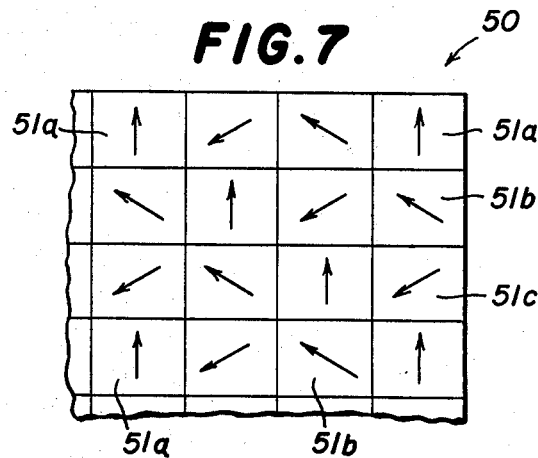

POLARISCOPE AND FILTER THEREFOR

BACKGROUND OF THE INVENTION

In analyzing stress in a specimen, two different pieces of information are important: the directions of principal stress and the magnitude of the difference in the stresses along the two principal directions. A polariscope is used to obtain this information. The polariscope includes a light source, a polarizer to linearly polarize the light from the source in a given plane, and an analyzer which transmits the component of light from the specimen which lies in a plane normal to the plane of polarization of the polarizer. The pattern developed at the analyzer can be focused onto a screen or exposed onto film.

The specimen may be a photoelastic model, or the specimen may be a photoelastic coating bonded fully or partially to the prototype.

When the specimen is under stress, the polariscope will depict two superimposed fringe patterns. One group, called isochromatic fringes, represents lines or contours along which the difference of principal stresses in the specimen is constant in magnitude. When white light is employed, the isochromatic fringes are colored bands. Also observed is an isoclinic fringe which is the locus of points in the specimen that have a principal-stress direction in the plane of polarization of the polarizer.

In order to obtain information on another isoclinic, the polarizer and analyzer are rotated together to different inclinations. The isoclinic fringe represents the locus of points that have a principal-stress direction in this new plane of polarization. This procedure is continually repeated until the desired number of isoclinics have been produced. Usually a photograph is taken of the pattern at each position of the polarizer/analyzer. This procedure is too time-consuming and expensive because of the need to change the orientations of the polarizer/analyzer and to take multiple photographs.

SUMMARY OF THE INVENTION

It is therefore an important object of the present invention to enable production of a single pattern having a family of isochromatic fringes and a family of isoclinic fringes without having to rotate the polarizer/analyzer in a polariscope.

In summary, there is provided a polarizing film comprising a multiplicity of light polarizing elements being polarized in a plurality of directions, and a multiplicity of light filtering means having a corresponding plurality of filtering wavelengths and being respectively associated with the light polarizing elements. In another aspect of the invention, there is provided a polariscope for analyzing the stress in a specimen, comprising a polarizer for location remote from the specimen and having a multiplicity of first light polarizing elements and a multiplicity of first light filtering means, the first light polarizing elements having polarization planes in a plurality of first directions, the first light filtering means having a corresponding plurality of filtering wavelengths, all of the first light polarizing elements having any given first plane of polarization being associated with all of the first light filtering means having any given filtering wavelength, an analyzer for location remote from the specimen and having a multiplicity of second light polarizing elements and a multiplicity of second light filtering means, the second light polarizing elements having polarization planes in a corresponding plurality of second directions respectively normal to the first directions, the second light filtering means having the plurality of wavelengths, all of the second light polarizing elements having any given second direction of polarization planes being associated with all of the second light filter means having any given filtering wavelength.

In a further aspect of the invention, there is provided a polariscope for analyzing the stress in a specimen, comprising a polarizer for location adjacent to one side of the specimen and being divided into a multiplicity of polarizer sections, each of the polarizer sections including a number of elongated, radially extending first light polarizing elements respectively having radial axes and having polarization planes therealong, an analyzer for location adjacent to the other side of the specimen and being divided into a corresponding multiplicity of analyzer sections, each of the analyzer sections including a corresponding number of elongated, radially extending second light polarizing elements respectively having radial axes and having polarization planes in directions respectively normal thereto, the second light polarizing elements being respectively aligned with the associated first light polarizing elements.

In another aspect of the invention, there is provided a polariscope for analyzing the stress in a specimen, comprising a polarizer for location adjacent to one side of the specimen and being divided into a multiplicity of sections, each of the sections including a number of elongated, radially extending light polarizing elements respectively having radial axes and having polarization planes at an angle of 45° thereto, and a multiplicity of light filtering means having a plurality of wavelengths and being respectively associated with the light polarizing elements.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the invention.

BRIEF DESCRIPTION OF THE DRAWINGS

For the purposes of facilitating an understanding of the invention, there is illustrated in the accompanying drawings, several preferred embodiments.

FIG. 1 is a schematic representation of a polariscope incorporating the features of the present invention;

FIG. 2 is a fragmentary, elevational view on an enlarged scale of the polarizer in the polariscope of FIG. 1;

FIG. 3 is a fragmentary plan view on an enlarged scale of the filtering portion of the polarizer of FIG. 2;

FIG. 4 is a fragmentary plan view on an enlarged scale of the polarizing film of the polarizer;

FIG. 5 is a fragmentary, elevational view on an enlarged scale of the analyzer in the polariscope of FIG. 1;

FIG. 6 is a fragmentary plan view on an enlarged scale of the filtering portion of the analyzer;

FIG. 7 is a fragmentary plan view on an enlarged scale of the polarizing film of the analyzer;

DESCRIPTION OF THE PREFERRED EMBODIMENTS

Figure 8:
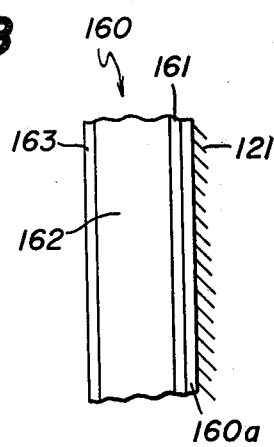
FIG. 8 is a fragmentary, elevational view of a specimen bearing a further embodiment of a polarizing film.

FIG. 1 depicts a plane-transmission polariscope 30 including a light source 32, a polarizer 34 and an analyzer 44. Also associated with the polariscope 30 is a camera 52 which has a lens 53, an iris 54, and a sheet of film 56. The polariscope 30 analyzes a photoelastic specimen 60 located between the polarizer 34 and the analyzer 44. The polarizer 34 and the analyzer 44 are on opposite sides of the specimen 60 and substantially removed therefrom.

Further details of the polarizer 34 are depicted in FIGS. 2-4. The polarizer 34 includes a transparent substrate 36 made of glass or the like. Formed on the surface of the substrate 36 is a filter 38. A polarizing film 40 is disposed on the outside of the filter 38. As shown in FIG. 3, the filter 38 is divided into a multiplicity of filtering elements 39a–39c, having a plurality of filtering wavelengths. In this embodiment, there are three such wavelengths. The elements 39a–39c repeat in a regular pattern in the example shown for this embodiment. Although this is not essential, it may be convenient for the control of the different wavelength intensities. The elements 39a only allow passage of light having a wavelength $\Lambda_a$, the elements 39b only allow passage of light having a wavelength $\Lambda_b$, and the elements 39c only allow passage of light having a wavelength of $\Lambda_c$.

The polarizing film 40 likewise is divided into a multiplicity of polarizing elements 41a–41c, having a plurality of polarization planes. In this example, there are three such planes which are all normal to the plane of the paper and are represented by arrows. Each of the elements 41a–41c has a square shape in this example and is identical in size and dimensions to the elements 39a–39c in the filter 38. As shown by the arrows, the plane of polarization of the elements 41a is at 0°. The plane of polarization of the elements 41b is at 60°, and the plane of polarization of the elements 41c is at 120° to the horizontal.

Ordinary light consists of random vector components that are transverse to the direction of propagation. The elements 41a–41c linearly polarize the light, that is, they block the components of the light electric vector vibrating in the direction transverse to the "arrows" of such elements and permit passage therethrough of the components parallel to such "arrows". Thus, light passing through the elements 41a will be polarized at 0°, light passing through the elements 41b will be polarized at 60°, and light passing through the elements 41c will be polarized at 120°.

The filter 38 and the polarizing film 40 are in juxtaposition, such that all of the light polarizing elements polarized in any direction of polarization are aligned with all of the filtering elements having a given filtering wavelength. Thus, all of the polarizing elements 41a are respectively aligned with the filtering elements 39a, all of the polarizing elements 41b are respectively aligned with the filtering elements 39b, and all of the polarizing elements 41c are respectively aligned with the filtering elements 39c.

White light from the source 32 is separated into its components by the filter 38. For example, $\Lambda_a$ corresponds to red, the wavelength $\Lambda_b$ corresponds to green, and the wavelength $\Lambda_c$ corresponds to blue. Thus, only the red component of the white light from the source 32 will pass through the elements 39a. Only green light from the source 32 will pass through the elements 39b. Only blue light from the source 32 will pass through the elements 39c. The red light passing through the filter elements 39a then passes through the polarizing elements 41a so as to be polarized at 0°. Similarly, the green light that passes through the elements 39b is polarized at 60°, and the blue light passing through the elements 39c is polarized at 120°.

Since the polarizer 34 is located remotely in respect to the specimen 60, light passing through each aligned pair of elements 39a–39c, 41a–41c illuminates an area of the specimen 60 much larger than the size of the elements because the light spreads. Moreover, such area is illuminated by light of the remaining two wavelengths and polarizations. In this particular embodiment, therefore, the relationship of one filtering element 39a–39c to adjacent filtering elements 39a–39c is not important. All of the elements 39a, for example, could be grouped together in one large area, all the elements 39b could be grouped together in another area and all the elements 39c could be grouped together in a third area. Alternatively, elements 39a–39c can occupy different-sized areas or be arranged in an irregular pattern. Similar comments are applicable to the polarizing film 40. However, whatever part of the filter 38 is designed to respond to wavelength $\Lambda_a$ will be polarized at a predetermined angle, 0° in the above sample. Similarly, that portion of the filter 38 responsive to $\Lambda_b$ should be polarized at another predetermined angle, in the example, 60°. That part of the filter 38 responsive to the wavelength $\Lambda_c$ should be polarized at the third predetermined angle, 120°, in this example.

The propagation velocity of the electric vector components along the principal stress direction at a given point in the specimen 60 depends on the principal stress magnitude. As a result, after passing through the specimen 60, the components perpendicular to the initial plane of polarization have amplitudes dependent mainly on the principal stress difference (average throughout depth of specimen) and on the angle between such initial plane and the principal direction at a given point of the specimen. Other parameters, such as thickness, are assumed to be constant.

Referring to FIG. 5, the analyzer 44 has a transparent substrate 46, a filter 48, and a polarizing film 50. The filter 48 is divided into a multiplicity of light filtering elements 49a–49c having a plurality of filtering wavelengths, in this case three such wavelengths, $\Lambda_a$, $\Lambda_b$, and $\Lambda_c$, which are the same respectively as the wavelengths of the filter 38. Although elements 49a–49c are shown to repeat in a regular pattern, that is not essential. The elements 49a preclude passage of light having a wavelength other than $\Lambda_a$, the elements 49b preclude passage of light having a wavelength other than $\Lambda_b$, and the elements 49c preclude passage of light having a wavelength other than $\Lambda_c$.

The polarizing film likewise is divided into a multiplicity of polarizing elements 51a–51c, having a plurality of polarization planes. In this example, there are three such planes, represented by the arrows. Each of the elements 51a–51c has a square shape in this example. The arrows signify the direction of the polarization plane which is substantially perpendicular to that of a corresponding element in the analyzer 34. Thus, the elements 51a have a plane of polarization at 90°, the elements 51b have a plane of polarization at 150°, and the elements 51c have a plane of polarization at 30°. The elements 51a–51c linearly polarize the light, that is, they block the components of the light electric vector vibrating in the directions transverse to their polarization planes and permit passage therethrough of the components parallel to such polarization planes. Thus, the elements 51a, 51b and 51c transmit only the components inclined at 90°, 150° and 30° to the horizontal, respectively.

The filter 48 and the polarizing means 50 are in juxtaposition, such that all of the light polarizing elements having a plane of polarization at a given angle are aligned with all of the filtering elements having a given filtering wavelength. Thus, all of the polarizing elements 51a are respectively aligned with the filtering elements 49a, all of the polarizing elements 51b are respectively aligned with the filtering elements 49b and all of the polarizing elements 51c are respectively aligned with the filtering elements 49c.

Following the same example used for the filter 38, $\Lambda_a$ corresponds to red, the wavelength $\Lambda_b$ corresponds to green, and the wavelength $\Lambda_c$ corresponds to blue. Only the red component passes through the elements 49a, and consequently the elements 51a. Only green light passes through the elements 49b, and consequently the elements 51b. Only blue light passes through the elements 49c, and consequently the elements 51c.

Since the analyzer 44 is located remotely in respect to the specimen 60 and close to the lens 53, light passing through each aligned pair of elements 49a–49c, 51a–51c is derived from an area of the specimen 60 much larger than the size of the elements 49a–49c as the light spreads. In this particular embodiment, moreover, such area is illuminated by light of the remaining two wavelengths and polarizations. Therefore, at a given iris 54 opening, the particular arrangement of the elements 49a–49c is irrelevant, in that only their gross areas falling within this opening affect the image formation on the film 56.

Furthermore, in this embodiment, there is no particular alignment between the elements in the filter 38 and the polarizing film 40 on the one hand, and the elements in the filter 48 and the polarizing film 50 on the other. Only the projection of light along the film axes of the polarizing elements 51a–51c will pass the analyzer 44. Such light will be colored according to the filter elements 49a–49c.

The intensity of light of a particular wavelength forming an image of the given point of specimen on the film 56 is as follows:

$$I = K \sin^2 2\alpha \sin^2 (\Delta/2)$$

In the above equation, I represents the intensity of the light; K is a constant proportional to the product of (1) the gross area of the elements transmitting light of a given wavelength in the polarizer 34 by (2) the gross area of the corresponding elements in the analyzer encompassed by the opening in the iris 54; $\alpha$ is the angle between the direction of either of the principal stresses and the plane of polarization for the given wavelength of the polarizer; and $\Delta = A(\sigma_1 - \sigma_2/\Lambda)$, $\Delta$ being the relative retardation A being a constant, $\sigma_1$ and $\sigma_2$ being the principal stresses, and $\Lambda$ being the given wavelength. Analysis of these equations shows that the light of the given wavelength will have a zero intensity, and will, therefore, extinct under two conditions. In the first condition, the light will be extinct when $\Delta/2 = \pi$ or any multiple thereof. As a result, a set of lines, known as isochromatics is produced which represents loci of constant principal-stress differences. In the second condition, the intensity will be zero whenever $\alpha = 0$, $\pi/2$ or any multiple thereof. The locus of points satisfying this condition is an isoclinic of the same parameter as is the inclination of the corresponding plane of polarization to the horizontal. At each point of an isoclinic, one of the principal stresses is parallel to the above plane.

Returning to the isochromatics, extinction of the color corresponding to the wavelength may occur for several multiples of $\pi$ (N=0, 1, 2, etc.), each line representing a particular principal-stress difference magnitude. Between these lines there will be several lines of the constant non zero intensity of the same color corresponding to constant principal-stress difference magnitudes.

Referring back to FIGS. 3–7, if the directions of principal stress in a certain portion of the specimen 60 illuminated by the polariscope 30, are 0° and 90°, such directions would coincide with the polarization plane of an element 41a and extinction of the red color would occur so that the principal-stress directions 0°, 90° would be characterized by the absence of red in the pattern. There will be a locus of points on the film 56 along which the red color is absent, identified as a 0° isoclinic.

A similar analysis can be made with respect to the performance of the elements 41b and 41c.

A 60° isoclinic would be characterized by the absence of the wavelength $\Lambda_b$, and a 30° isoclinic would be characterized by the absence of the wavelength $\Lambda_c$. In the example given $\Lambda_b$ corresponds to the color green and $\Lambda_c$ corresponds to the color blue. Thus, the isoclinics would appear on the film 56 as loci of points with lack of green or lack of blue.

Figure 9:
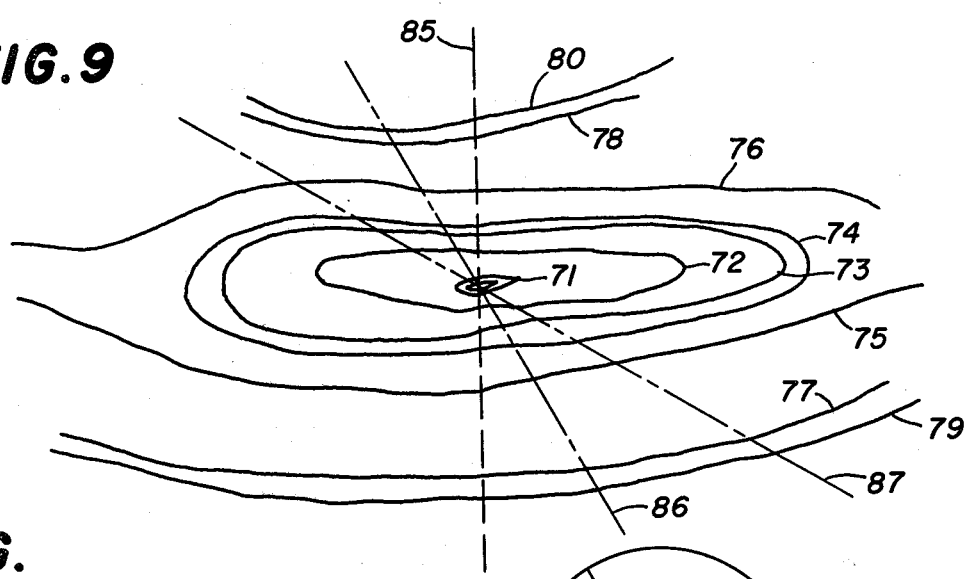
FIG. 9 is a schematic representation of a typical pattern produced by the polariscope of FIG. 1.
Figure 11:
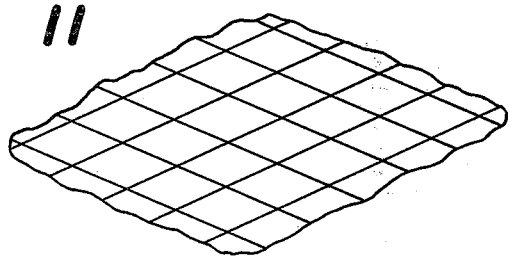
FIG. 11 is a view like FIG. 4, of another embodiment, wherein the light polarizing elements are rhomboid in shape rather than square.

FIG. 9 is a schematic representation of a typical photograph obtained using the polariscope 30. There is depicted a plurality of isochromatics 70–80 and three isoclinics 85–87 of parameters 0°, 30°, and 60° respectively. For purpose of illustration, the names of the colors are established using the following rule:

"no $\Lambda_a$"+"no $\Lambda_b$"+"no $\Lambda_c$"="black"
"no $\Lambda_a$"+"no $\Lambda_b$"+"$\Lambda_c$"="blue"
"no $\Lambda_a$"+"$\Lambda_b$"+"no $\Lambda_c$"="green"
"no $\Lambda_a$"+"$\Lambda_b$"+"$\Lambda_c$"="blue-greenish"
"$\Lambda_a$"+"no $\Lambda_b$"+"no $\Lambda_c$"="red"
"$\Lambda_a$"+"no $\Lambda_b$"+"$\Lambda_c$"="purple"
"$\Lambda_a$"+"$\Lambda_b$"+"no $\Lambda_c$"="yellow"
"$\Lambda_a$"+"$\Lambda_b$"+"$\Lambda_c$"="white"

For example, the colors of the isochromatics 71–80 are, respectively, black, white, yellow, red, blue, blue, green, green, purple, purple. In the preferred embodiment the three isoclinics of parameters 0°, 30°, and 60° can be identified by the absence of the light of wavelengths $\Lambda_a$, $\Lambda_c$, $\Lambda_b$.

At crossings of the isochromatic 71–80 with the the 0° isoclinic 85, the colors are respectively black, blue-greenish, green, black, blue, blue, green, green, blue, blue. At crossings of the isochromatics 71–80 with the 30° isoclinic 86, the colors are respectively black, yellow, yellow, red, black, black, green, green, red, red. At crossings of the isochromatics 71–80 with the 60° isoclinic 87, the colors are respectively, black, purple, red, red, blue, blue, black, black, purple, purple.

The tint changes gradually along the isoclinic and isochromatic fringes so that the lines can be interpolated through the small areas where the mutually crossing isoclinic and an isochromatic are of the same color.

In the above example, the photograph depicts isoclinics at 0°, 30° and 60° without any rotation of the polarizer 34 and analyzer 44. In the past, only one isoclinic would be visible; for example, the isoclinic 85. Then the polarizer 34 and analyzer 44 would be rotated 30° and a second picture taken in which the isoclinic 86 would be represented. At further rotation, an additional 30° would enable a photograph to be taken depicting the third isoclinic 87. Each photograph would have the same isochromatics 71–80. By utilizing individually polarized areas in conjunction with filtering elements as described, a single photograph of all isochromatics and three isoclinics can be generated. If it is desired to obtain additional isoclinics at other angles, then the polarizer 34 and analyzer 44 may be rotated. For example, if they were rotated 20°, then a set of isoclinics at 20°, 50° and 80° can be generated. With two photographs, six isoclinics can be generated.

The number of isoclinics in the photograph will correspond to the number of polarization planes in the polarizing films 40 and 50. In other words, if there were say six instead of three, then the photograph would depict six isoclinics. The difficulty with increasing the number of isoclinics is that the greater the number of isoclinics, the more confused the picture becomes. The isoclinics are not lines such as those schematically represented in FIG. 9. Rather, they have finite width. Also, the isochromatics 71–80 are not lines, and they too have width. The greater the number of polarization planes and, thus, of isoclinics recorded, the more confusion in the picture and the more difficult it is to obtain meaningful information on the isochromatics and/or the isoclinics using the above technique. It can be shown that just two polarization planes will suffice for the analysis if the intensities are measured and the above equations are solved for $\sigma_1 - \sigma_2$ and $\alpha$. In the latter case, it may be advantageous to use close wavelengths (90–95%) or wavelengths whose ratio equals the fraction n/m where n and m are integers. This will facilitate the isochromatic order identification.

In the foregoing description, the filter 38 and the polarizing film 40 are separate. Alternatively, the elements 41a–41c can be themselves colored to produce the same effect without the need of a separate filter. In other words, the elements 41a would be dyed to permit passage of the color red only, the elements 41b would be dyed to permit passage of the color green only, and the elements 41c would be dyed to permit passage of the color blue only.

Although the analyzer 44 is shown to be between the specimen 60 and the lens 53, the analyzer could be positioned between the lens 53 and the iris 54 or between the iris 54 and the film 56.

Figure 10:
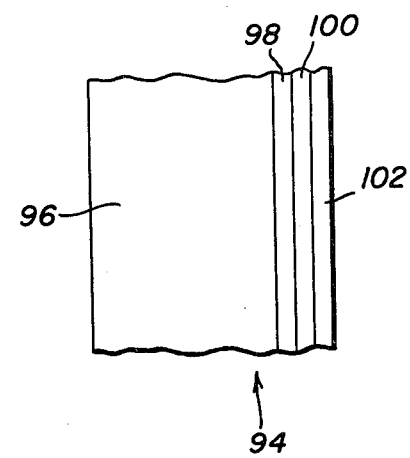
FIG. 10 is a fragmentary, elevational view of another embodiment of a polarizer wherein a quarter-wavelength film is added.

A modification to the polarizer 34 is shown in FIG. 10. There is depicted a polarizer 94 having a transparent substrate 96, a filter 98, and a polarizing film 100. In addition, a further polarizing film 102 is provided in which certain areas furnish circular polarization, which will eliminate all of the isoclinics and enable close study of the isochromatics. Selected isoclinics can be eliminated by circularly polarizing the appropriate elements of the polarizer 34 and analyzer 44.

Figure 12:
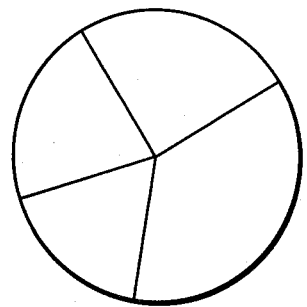
FIG. 12 is a view like FIG. 4, of another embodiment, wherein the light polarizing elements are wedge-shaped segments.

Although the elements 39a–39c, 41a–41c, 49a–49c and 51a–51c are square in the embodiment of FIGS. 1–7, that is not necessary. For example, those elements can have a rhomboid shape as shown in FIG. 6. Also, instead of being divided into small elements, the polarizer 34 and the analyzer 44 can be round, as shown in FIG. 12, and divided into a plurality of wedge-shaped segments, each being polarized in a different direction. In the embodiment of FIG. 12, there are four such areas and therefore four such polarizations. The four planes or directions of polarization of the areas of the analyzer would be respectively perpendicular to the four planes or directions of polarization of the areas of the polarizer. Each of these areas is dyed to permit passage of certain wavelengths, or separate filters associated with the polarizer and analyzer are utilized.

Figure 13:
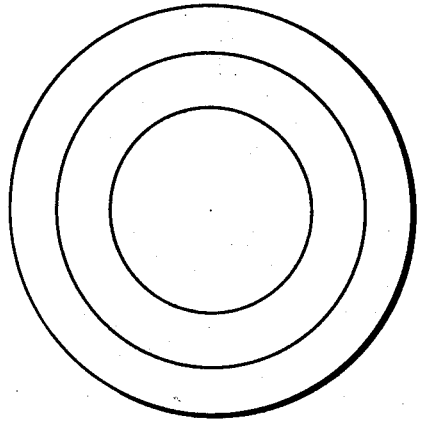
FIG. 13 is a view like FIG. 4, of another embodiment, wherein the light polarizing elements are rings.

The polarizer and the analyzer can be divided into ring-shaped areas as shown in FIG. 13. The three areas are polarized in different directions, say 0°, 30° and 60°. In such instance, corresponding areas of the analyzer would be polarized at 90°, 120° and 150° respectively. The filtering means can be either impregnated into the polarizing films or be provided as a separate part. This embodiment is advantageous in that the number of isoclinics can be selected. If the iris 54 is opened completely, then all three areas will be exposed and isoclinics corresponding to all three will be depicted in the photograph. If it is desired to depict only two isoclinics, then the opening in the iris 54 is reduced so that the outermost ring is not exposed to light. If only one isoclinic is desired, then the iris 54 is reduced in size further to expose only the central round area.

Figure 14:
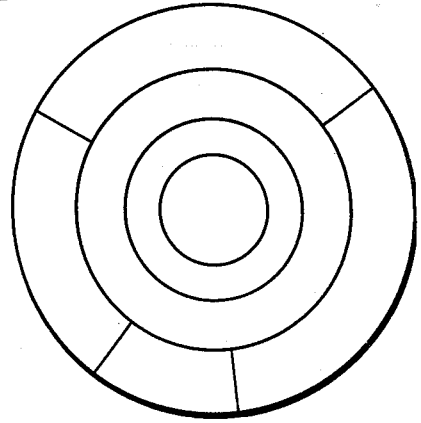
FIG. 14 is a view like FIG. 4, of another embodiment, where the light polarizing elements at the center are concentric rings, and those in the outermost ring are arc-shaped segments.

A further embodiment is depicted in FIG. 14 which is a combination of the embodiments of FIGS. 12 and 13. The arc-shaped sections in the outermost ring are polarized in four different directions, the next two rings are polarized in two different directions, and the central round area is polarized in a seventh direction. If the opening in the iris 54 is reduced so as not to utilize the four areas in the outermost ring, the corresponding isoclinics are simultaneously eliminated. Further reduction in the number of isoclinics may be obtained by reducing further the size of the opening in the iris.

Figure 15:
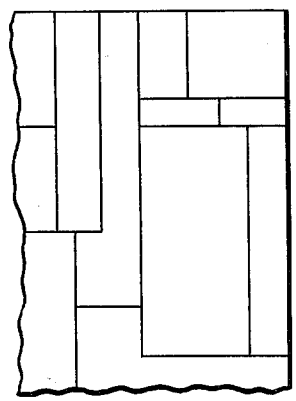
FIG. 15 is a view like FIG. 4, of another embodiment, in which the light polarizing elements have an irregular shape.

The areas or elements need not be regularly shaped. They can be of varying shape and size as shown in FIG. 15. The polarizing film in the polarizer 34 can have polarizing elements of one size and shape and the elements in the polarizing film of the analyzer 44 can have different sizes and shapes. The elements in one can be irregular like that shown in FIG. 15, while the elements in the other can be regularly shaped as in the previous embodiments. However, in all cases, the filtering means, whether in the form of a separate part or as dyes in the polarizing film, must correspond to the shape and size of the elements in the associated polarizing film, so that all light polarized in a given direction has a predetermined color.

Figure 16:
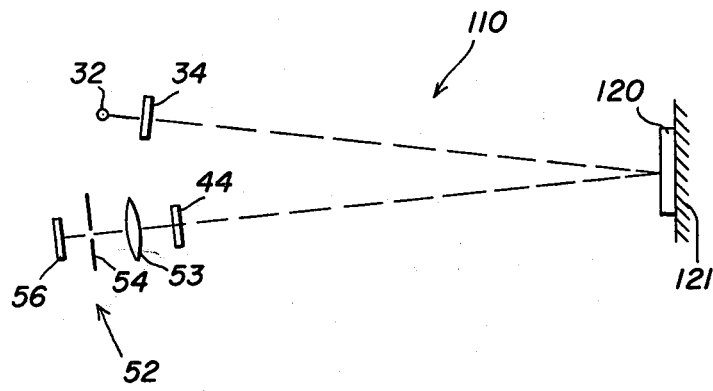
FIG. 16 is a schematic view of another arrangement of the polariscope, in which both the polarizer and the analyzer are located on the same side of the specimen.

FIG. 16 depicts a further embodiment in which a polariscope 110 includes the light source 32, the polarizer 34 and the analyzer 44. Also associated with the polariscope 110 is the camera 52 having the lens 53, the iris 54 and a sheet of film 56. The reflection polariscope 110 analyzes a mirrored specimen 120 which is a photoelastic coating, the strain in which represents the strain in a prototype 121. In this form, the polarizer 34 and the analyzer 44 are on the same side of the specimen 120, but substantially removed therefrom. The explanation with respect to the polariscope 30 and its mode of operation and the patterns produced thereby are applicable to this embodiment also.

Figure 17:
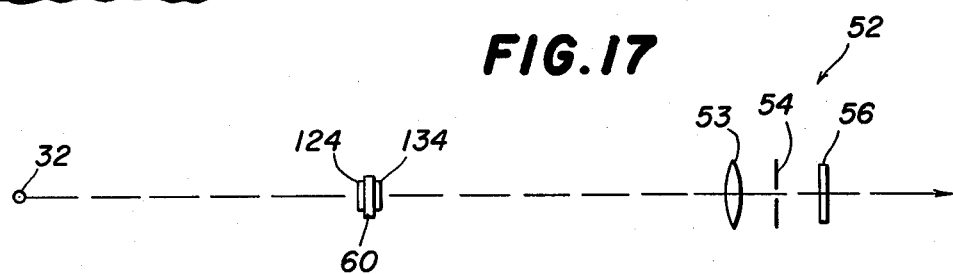
FIG. 17 is a view of another arrangement of the polariscope, in which the polarizer and the analyzer are adjacent to the specimen on opposite sides thereof.
Figure 18:
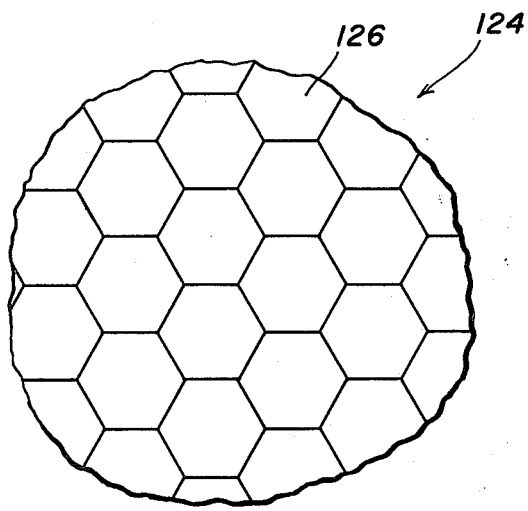
FIG. 18 is a fragmentary plan view on an enlarged scale of some of the polarizing-and-filtering sections in the polarizer of FIG. 17.
Figure 19:
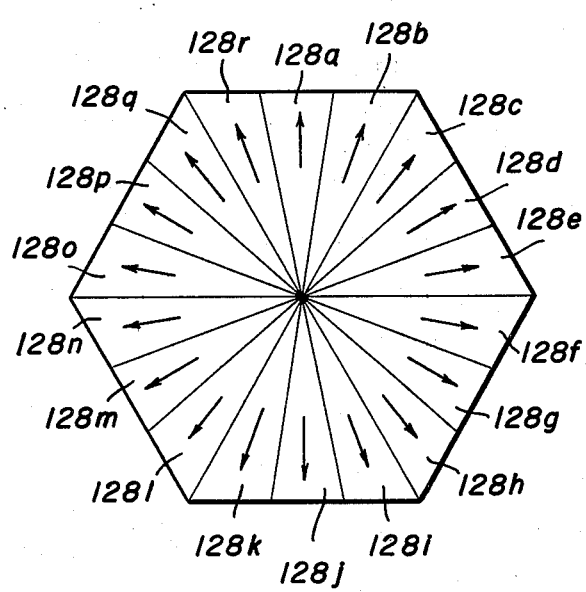
FIG. 19 is an enlarged view of one of the polarizing-and-filtering sections of FIG. 18.

A further embodiment of the invention is depicted in FIG. 17. The source 32 directs light to a platelike photoelastic specimen 60 having on one side thereof a polarizer coating 124 and on the other side thereof an analyzer coating 134, which coatings are preferably bonded to the specimen 60. A camera 52 with its lens 53, iris 54 and the film 56 receives light passing through the coating 134. As shown in FIG. 18, the polarizer coating 124 is divided into a multiplicity of tiny hexagonal sections 126. Although the sections are shown to be adjacent to each other, each such section 126 may be surrounded by an opaque region, which region is represented by the line defining the hexagonal outline of each section. Referring to FIG. 19, each such section is divided into a number of elongated, radially extending, triangularly-shaped elements 128a–128r. The intersection of the elements 128a–128r may be referred to as a predetermined polarizer point from which the elements 128a–128r extend radially. In this embodiment there are 18 such elements. The plane of polarization of each of the elements 128a–128r is directed along the line bisecting its center angle. Each of the elements 128a–128r is dyed one of a plurality of colors. In this embodiment, three colors are utilized. The elements 128a, d, g, j, m, and p are dyed one color. The elements 128b, e, h, k, n, and q are dyed a second color, and the elements 128c, f, i, l, o and r have a third color. The first color may be blue, the second color green, and the third red.

White light from the source 32 is polarized at 90° by the element 128a, at 70° by the element 128b, at 50° by the element 128c, at 30° by the element 128d, at 10° by the element 128e, at 350° by the element 128f, at 330° by the element 128g, and so forth. Only blue light passes through the element 128a. Also, only blue light is polarized at 0°, 330°, 270°, etc. Only green light is polarized at 70° because only the green component passes through the element 128b. Similarly, the light polarized at 10°, 310°, 250° is green. The light polarized at 50° is red because the element 128c is dyed red. Similarly, red light is polarized at 250°, 290°, etc.

Figure 20:
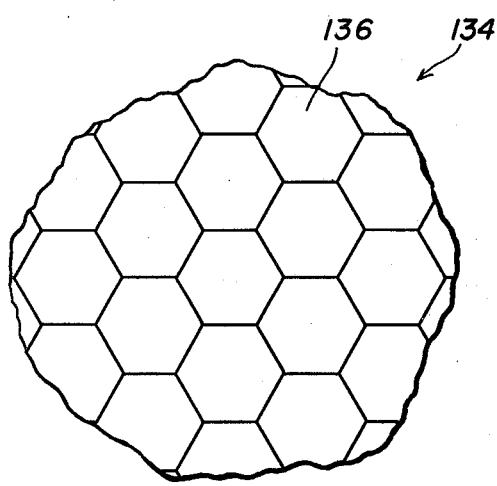
FIG. 20 is a fragmentary plan view on an enlarged scale of some of the polarizing-and-filtering sections in the analyzer of FIG. 17.
Figure 21:
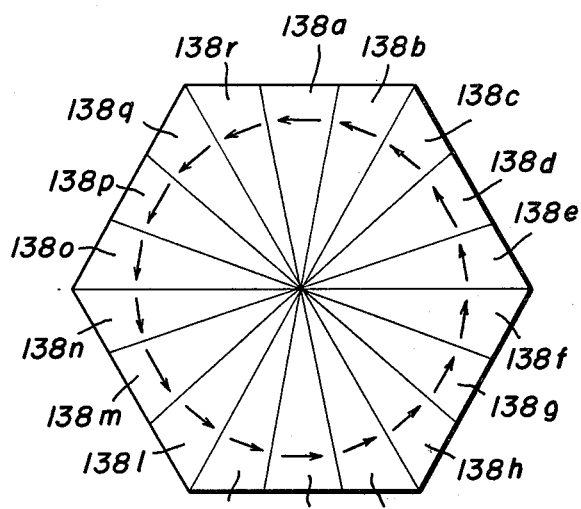
FIG. 21 is an enlarged view of one of the polarizing-and-filtering sections of FIG. 20.

The analyzer coating 134 disposed on the other side of the specimen 60 is divided into a multiplicity of tiny hexagonal sections 136, as shown in FIG. 20. Referring to FIG. 21, each such section is divided into the same number of elements 138a–138r as contained in the polarizer coating 124, and are identically shaped and sized and are respectively aligned therewith. The intersection of the elements 138a–138r may be referred to as a predetermined polarizer point from which the elements 138a–138r extend radially. Each of the elements 138a–138r polarizes the light in a plane normal it its axis. The elements 138a–138r are dyed the same respective colors as the corresponding elements 128a–128r. Accordingly, the elements 138a, d, g, j, m, and p are dyed blue, the elements 138b, e, h, k, n, and q are dyed green, and the elements 138c, f, i, l, o, and r are dyed red.

Since the analyzer coating 134 is located adjacent to the specimen 60, light passing through each element 128a–128r passes almost entirely through the aligned elements 138a–138r in the analyzer coating 134. Such alignment is important. Each pair of aligned elements can be analyzed in the same way as elements in the first embodiment. As explained previously light extincts when α equals 0°, 90° and any integer multiple of 90°, where α is the angle between the directions of principal stress and the direction of the polarization plane of each element 128a–128r. Thus, for each associated pair of elements in the two coatings, there will be two directions in which the light will extinct. For example, if the principal stress directions in the specimen 60 are horizontal and vertical then the elements 128a–128r will be darkened. The axes of the elements 138 e and 138f being inclined respectively ±10°, therefore close to 0°, will be shaded or slightly darkened. Similarly, the elements 138n and 138o will be slightly darkened because their polarization directions are so close to 180°. Similarly, if the principal directions of stress in the specimen 60 were at 30° and 120°, the elements 138d and 138m would appear darkened. No element has its axis precisely at 120° and 300°, but the elements 138h, i, q and r are close and therefore they appear shaded.

Figure 22:
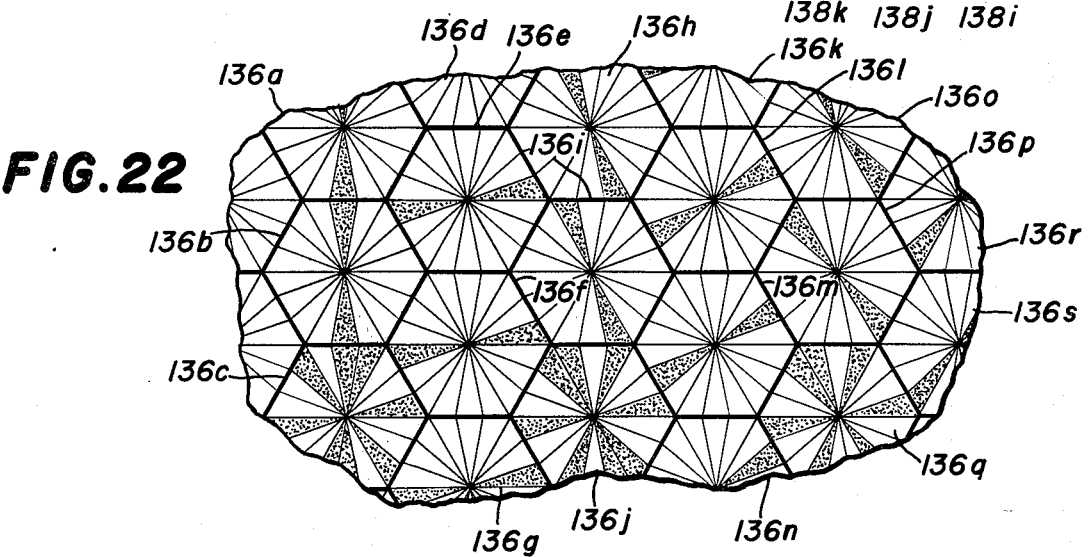
FIG. 22 is a schematic representation of the pattern on some of the polarizing-and-filtering sections in the polariscope of FIG. 17.

FIG. 22 depicts a fragment of the pattern in the analyzer coating 134 as it might appear in response to certain stresses in the specimen 60. The sections bear the numbers 136a–136s. Some of the sections have particular ones of the elements 138a–138r thereof darkened to signify extinction. In this example, it is assumed that the sections 136a–136c are located adjacent to points in the specimen 60 where the principal stress directions are 0°, 90°, in which case the elements 138a and 138j of each of the sections 136a–136c are extinct. As previously explained, there will be other elements of each such section which are darkened to a lesser degree, but for the sake of simplifying the drawing, only those elements which are completely darkened are shown in this figure. Let it be assumed further that the sections 136c, 136j and 136q lie along the purple isochromatic, in which case there would be an absence of green in each such section. As a result, the elements 138b, e, h, k, n and q on the sections 136c, 136j, and 136q are shown darkened. It is assumed that the sections 136d–138g lie along the 10° isochromatic, whereby the elements 138e and 138n are shown darkened on each. The sections 136h–136j lie along the 20° isochromatic, whereby the elements 138i and 138r are shown darkened on each. The sections 136k–136n are assumed to lie along the 30° isoclinic, so that the elements 138d and 138m of each such section are shown darkened. The sections 136o–136q lie along the 40° isoclinic so that the elements 138h and 138q on each such section are shown darkened. The sections 136r and 136s lie along the 50° isoclinic so that the elements 138c and 138l of each such section are shown darkened.

One skilled in reading these patterns will be able to identify the isoclinic corresponding to each pair of principal stress directions and the isochromatics corresponding to various principal stress differences. In this example, one isochromatic and five isoclinics are identified. There may, of course, be many isochromatics as described previously. Each isochromatic will be the locus of points corresponding to a particular color. There will be many sections characterized by the absence of green signifying the purple isochromatic. Similarly, a yellow isochromatic will correspond to the locus of sections in which the blue elements 138a, d, etc. are darkened. A blue-green isochromatic will be produced as the locus of sections in which the red elements c, f, i, etc. are darkened. Between these isochromatics will be other bands corresponding to different colors representing other isochromatics.

For simplicity in illustration, the isoclinics are shown drawn next to one another and explained as though one vertical column represents the locus of points along which the principal stress direction is one value and the next column represents a jump of 10° in the principal stress directions. In point of fact, however, there is a continuum so that one column representing 0°, 90° principal stress directions will be where the elements 138a, 138j are darkest. On either side of that column, those same elements will have some shading to them. Several rows over, the elements 138e and 138n may be darkened to a maximum extent. The rows between these two will have a continuum of variation in shading. This variation in shading is not shown in FIG. 23.

As a result, instead of lines corresponding to the isoclinics and isochromatics as defined by darkened sections, there are bands of colors which are apparent in the pattern, much like the explanation made above with respect to FIG. 9.

Figure 23:
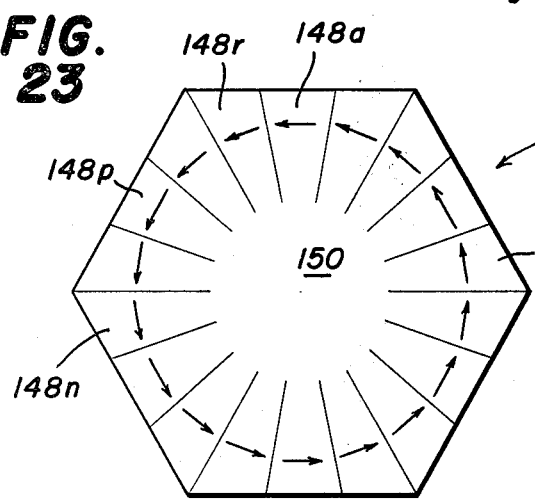
FIG. 23 is a view like FIG. 19, depicting an alternative embodiment.

A further important piece of information derived from the pattern shown in FIG. 23 is the identification of what is referred to as isostatics or trajectories of principal stress, that is, the locus of points along which the principal direction of stress in the specimen 60 is tangent to the same locus. The sections 136f and 136l define two points along such trajectory. A curve may be drawn through the elements 138n and 138e of the section 136f and through the elements 138m and 138d of the section 136l. Such line can be drawn through the section corresponding to a 50° angle of principal stress direction (not shown). The sections 136g, 136m and 136r define another trajectory. The locus of the trajectory is defined by the elements 138n and 138e in the section 136g, the elements 138m and 138d in the section 136m, and the element 138l in the section 136r.

A second set of orthogonal trajectories is defined by sections in the 0°, 20° and 40° isoclinics. There is not sufficient height to FIG. 22 to identify the sections in such trajectories.

The performance of the embodiment of FIGS. 17 and 22 would not substantially be affected by using monochromatic light and undyed elements. In that event, the isoclinics and trajectories would be characterized by various shades of black and white rather than by colors. The colors in the elements are significant for another reason. The light tends to be refracted by the specimen 60 so that although the associated sections in the polarizer coating 124 and the analyzer 134 may be perfectly aligned, light passing through one element in the polarizer coating 124 may be refracted or dispersed so as to strike a different element in the analyzer coating 134 than that to which it is designed to respond. The use of dyed sections prevents such stray light from passing through non-associated filter elements.

In this embodiment, the center of each section being the intersection of 18 elements may appear blurred, thereby confusing to some extent the patterns. This deficiency is corrected in the alternative embodiment depicted in FIG. 23. FIG. 23 depicts a single section like that in FIG. 19 of the analyzer coating 134. It is divided into 18 elements 148a–148r which are truncated. The center area 150 may furnish circular polarization to block isoclinics. The elements 148a–148r are radially polarized just like the elements 138a–138r in FIG. 21. However, there is no blurring and resultant confusion at the center of each section.

Figure 24:
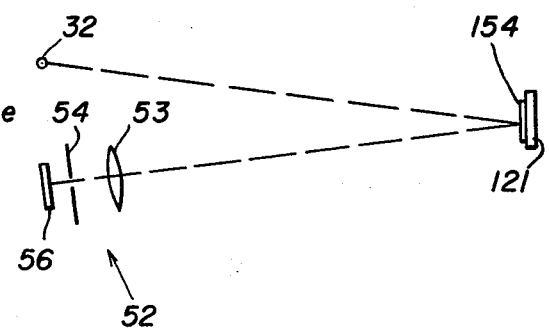
FIG. 24 is a view of another arrangement of the polariscope, in which a single coating, functioning as both the polarizer and the analyzer, is cemented onto the specimen.
Figure 25:
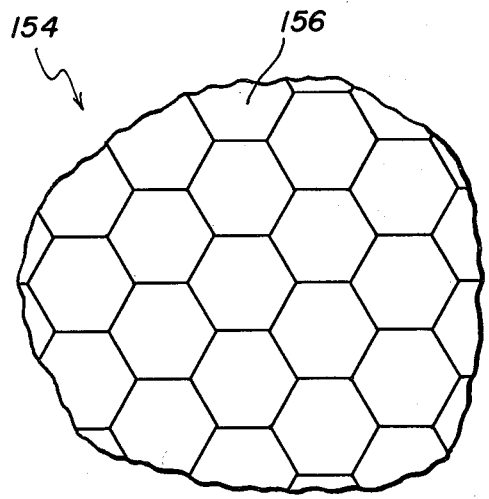
FIG. 25 is a fragmentary plan view on an enlarged scale of some of the polarizing-and-filtering sections in the polarizer of FIG. 24.
Figure 26:
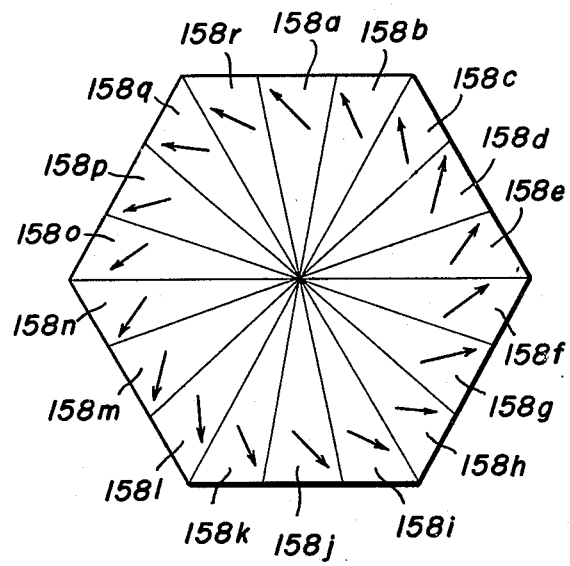
FIG. 26 is an enlarged view of one of the polarizing-and-filtering sections of FIG. 26.

FIG. 24 depicts a further embodiment of the present invention. The source 32 directs light to a specimen 154 which is a layer of photoelastic material bearing a polarizer coating thereon. The strain in such specimen represents the strain in the prototype 121. A camera 52 with its lens 53, iris 54 and film 56 receives light reflected from the mirrored rear surface of the specimen 154. As shown in FIG. 25, the polarizer coating is divided into a multiplicity of tiny hexagonal sections 156. Although the sections 156 are shown to be adjacent to each other, each such section 156 may be surrounded by an opaque region, which region is represented by the line defining the hexagonal outline of each section. Referring to FIG. 26, each such section is divided into a number of elongated, radially extending, triangularly-shaped elements 158a–158r. The intersection of the elements 158a–158r may be referred to as a predetermined polarizer point from which the elements 158a–158r extend radially. In this embodiment, there are 18 such elements. Each of the elements 158a–158r polarizes an incident beam in the plane oriented at an angle of 45° with respect to the line bisecting the center angle, as shown by the arrows in each such element. As a result, the 18 elements 158a–158r transmit the light which is polarized in different directions. Each of the elements 158a–158r is dyed one of a plurality of colors. In this embodiment, three colors are utilized. The elements 158a, d, g, k, n and q are dyed one color. The elements 158b, e, h, j, m, and p are dyed a second color. The elements 158c, f, i, l, o and r are dyed a third color. The first color may be green, the second color red, and the third color blue. It will be noted that the color pattern is not symmetrical. The pattern is symmetrical for the elements 158a–158i and a different pattern applies for the elements 158j–158r. The lack of symmetry is important in this embodiment where color plays a more crucial role than in the other embodiments.

White light from the source 32 is polarized at 135° by the element 158a, at 115° by the element 158b, at 95° by the element 158c, and so forth. Only the green component passes through the element 158a and is polarized at 135°. The red light passing through the element 158b is polarized at 115°. Blue light passing through the element 158c is polarized at 95°.

Light from the polarizer coating 154 enters the specimen 60, passes it and reflects from the mirrored layer on the rear surface thereof. After being acted upon by the specimen 60, the light returns through the polarizer coating 154.

Whereas in the earlier embodiments, the light would extinct when the angle between a principal stress direction in the specimen 60 and the analyzer was 0°, 90°, or some integer multiple of 90°, in this embodiment, extinction requires two conditions: (1) the angle between either principal stress direction and the axis of a polarizer element is 45°, and (2) the ratio of principal stress difference to the wavelength is proportional to (2n+1)/2 where n equals 0, 1, 2, 3, etc. For example, if (1) the direction of stress at a point in the specimen 60 is 90° and (2) the difference of the principal stresses at such point corresponds to the green isochromatic in a dark-field polariscope, the element 158a would be darkened.

It is important to note that none of the other green-dyed elements 158d, g, e, n and q would be extinct because as to each of them both conditions are not simultaneously satisfied. The second condition would be satisfied since all the elements would lie along the same isochromatic. However, in none of the others would the angle of polarization thereof be 45° away from the 90° direction of the principal stress, assumed to occur at the analyzed point.

Once it is known that one of the principal stress directions is 90°, the other one is at 0° (or 180°) since the two directions of principal stress are always at 90° to each other. The element 158n, for example, would be shaded rather than completely darkened. Its direction of polarization is 235°, so that the angle between its direction of polarization and the other direction of principal stress (180°) would be 55°, which is close to 45°. Of course, the element 158n would be slightly somewhat darker than the element 158k because the angle of the former would be closer to 45°.

Figure 27:
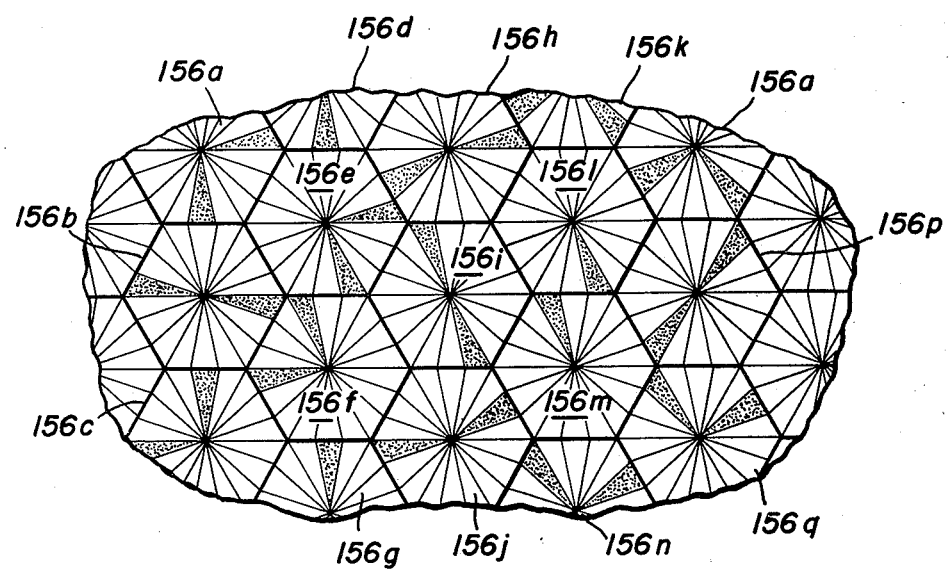
FIG. 27 is a schematic representation of the pattern on some of the polarizing-and-filtering sections of the polariscope of FIG. 24.

FIG. 27 depicts a fragment of the polarizer coating 154 as it might appear in response to certain stresses in the specimen 60. The sections bear the numbers 156a–156q. Some of the sections have particular ones of the elements 158a–158r darkened to signify extinction. Those elements as to which the angle between its direction of polarization and one of the principal stress directions is 45°, are shown darkened. Also, those elements where such angle is close to 45°, i.e. 35° or 55°, are also shown darkened. In this example, it is assumed that the sections 156a, 156b and 156c are located adjacent to points in the specimen 60 where the principal stress directions are 0° and 90°. It is further assumed that the sections 156a, 156h, and 156o lie along the blue-green isochromatic. Red is the complement of blue-green, whereby the blue-green isochromatic has no red component. It is further assumed that the sections 156b, 156i, and 156p lie on the yellow isochromatic. Since blue is the complement of yellow, such isochromatic has no blue component. It is assumed that the sections 156c, 156j, and 156q lie along the purple isochromatic which is characterized by the absence of its complement, green.

Referring first to the section 156a, the elements 158e and 158j are extinguished. The angle between the direction of polarization of the element 158j (315°) and the 270° principal stress direction is precisely 45°, thereby meeting the first condition. Also, the section 156a lies along the blue-green isochromatic characterized by the absence of red, thereby meeting the second condition. Accordingly, the element 158j is shown extinct. The angle between the axis of the element 158e (55°) and the 0° principal stress direction is 55°, which is within the 35°–55° limits, so that the first condition is met. The color of the element 158e is red, so that the second condition is met and it is extinguished. None of the other elements in the section 156a meet these conditions.

Using similar analysis, the elements 158f and 158o in the section 156b will be extinguished, both being blue and lying on the yellow isochromatic where no blue is present. The angle between the polarization axes of these two elements (35°, 215°) and the 0°, 180° principal stress directions is 35°. In the section 156c, the elements 158a and 158n will be darkened. Both are green and lie along the purple isochromatic characterized by the absence of green. The angles between the respective axes of polarization (135°,235°) and the 90°, 180° principal stress directions are respectively 45°, 55°.

It is assumed that the sections 156h, 156i, and 156j lie along the 20° isoclinic, corresponding to stress directions of 20°, 110°, 200°, and 290°. The elements 158e and 158m of the section 156h will be darkened. Both are red and lie along the blue-green isochromatic where no red is present. The angle between the direction of polarization of the element 158e (75°) and the principal stress direction of 110° is 35°. The angle between the direction of polarization of the element 158m (255°) and the principal stress direction of 200° is 55°. Similarly, the elements 158i and 158r in the section 156i will be darkened, as will be the elements 158d and 158n in the section 156j.

It is assumed that the sections 156o, 156p, and 156q lie along the 40° isoclinic so that the elements 158h and 158m in the section 156o are darkened, the elements 158c and 158l in the section 156p are darkened, and the elements 158d and 158q in the section 156q are darkened.

It is assumed that the sections 156d–156g lie along the 10° isoclinic (stress directions 10°, 100°, 190°, 280°). The elements 158j of the section 156g will be darkened. The angle between its polarization direction (315°) and the 280° principal stress direction is 35°. Also, such element is within the blue-green isochromatic band in which red is absent. Also, red is absent from the element 158e in the section 156e. The angle between the polarization direction of the element 158e (55°) and the 10° principal stress direction is precisely 45°, and therefore it is darkened. The element 158i of the section 156e is in the yellow isochromatic band. Moreover, the angle between its direction of polarization (335°) and the 280° principal stress direction is 55°. Accordingly, such element is darkened. Using similar analysis, the elements 158n and 158r in the section 156f are darkened as is the element 158a in the section 156q.

It is assumed that the sections 156k–156n are aligned with the 30° isoclinic (stress directions 30°, 120°, 210°, 300°). Accordingly, using the same analysis, the elements 158h and 158m in the section 156k are darkened as is the element 158i of the section 156l. Also, the element 158r of the section 156m is darkened. The elements 158d and 158q of the section 156n are also darkened.

By analyzing the pattern thus produced, the location of the various isoclinics and isochromatics can be made. Such analysis can be visually made or can be made by a suitably programmed computer. The patterns produced by the previous embodiments can also be computer analyzed. Also, the trajectories or isostatics can be gleaned from this pattern.

As with the embodiment of FIGS. 17–22, the isoclinics are shown drawn next to one another and explained as though one vertical column represents the locus of points along which the principal stress direction is one value and the next column represents a jump of 10°. Actually, there is a gradual change. Similarly, the isochromatic bands of blue-green, yellow and purple are shown as being next to one another and a sharp line of demarcation between the two. Actually, there is a gradual change of color between each isochromatic. Also, the colors mentioned in the examples are not necessarily what would be experienced in practice.

In order to clarify the center areas of each section, they may be circularly polarized like the section depicted in FIG. 23.

FIG. 8 depicts another embodiment of the present invention in which the specimen 160 has a reflective mirror layer 160a applied thereto. A color-and-polarizing film 161 has a construction like that shown in FIGS. 18 and 19. Next is a photoelastic layer 162. A second colorizing and polarizing film 163 having the construction depicted in FIGS. 20 and 21 is on the layer 162. This embodiment performs in much the same way as the embodiments of FIGS. 17–22 except that only a single side of the prototype 121 need be accessible.

What has been described therefore are a number of embodiments of an invention whereby not only may the several isochromatics be depicted, but also several isoclinics can simultaneously be provided. In certain of the embodiments, isostatics or trajectories are also depicted.

I claim:

1. In a polariscope for analyzing the stress in a specimen, comprising a polarizer for location remote from the specimen and having a multiplicity of first light polarizing elements and a multiplicity of first light filtering means, said first light polarizing elements polarizing light in a plurality of first directions, said first light filtering means having a corresponding plurality of filtering wavelengths, all of said first light polarizing elements having any given first direction of polarization being associated with all of said first light filtering means having any given filtering wavelength, an analyzer for location remote from the specimen and having a multiplicity of second light polarizing elements and a multiplicity of second light filtering means, said second light polarizing elements polarizing light in a corresponding plurality of second directions respectively normal to said first directions, said second light filtering means transmitting only said plurality of wavelengths.

2. In the polariscope of claim 1, wherein said polarizer and said analyzer are arranged to be disposed on opposite sides of the specimen.

3. In the polariscope of claim 1, wherein said polarizer and said analyzer are arranged to be disposed on the same side of the specimen.

4. In the polariscope of claim 1, wherein each of said light polarizing elements is of regular shape.

5. In the polariscope of claim 1, wherein both said polarizer and said analyzer are round.

6. In the polariscope of claim 1, wherein each of said light polarizing elements is ring shaped in outline.

7. In the polariscope of claim 1, wherein each of said first light polarizing elements tapers toward the center of said polarizer.

8. In the polariscope of claim 1, wherein each of said second polarizing elements tapers toward the center of said analyzer.

9. In the polariscope of claim 1, wherein said analyzer is round, the second light polarizing elements near the periphery of said analyzer being arc shaped, the rest of said second light polarizing elements being ring shaped in outline.

10. In the polariscope of claim 9, wherein at least one of said ring-shaped elements induces circular polarization.

11. In the polariscope of claim 1, having the same number of first light polarizing elements, first light filtering means, second light polarizing means elements, and second light filtering means.

12. In the polariscope of claim 1, wherein said polarizer and said analyzer are substantially identical, each having substantially the same number of light polarizing elements.

13. In a polariscope of analyzing the stress in a specimen, comprising a polarizer for location adjacent to one side of the specimen and being divided into a multiplicity of polarizer sections and having a predetermined polarizer point, each of said polarizer sections including a number of elongated first light polarizing elements extending radially from said polarizer point and respectively having radial axes and polarizing light therealong, an analyzer for location adjacent to the other side of the specimen and being divided into a corresponding multiplicity of analyzer sections and having a predetermined analyzer point, each of said analyzer sections including a corresponding number of elongated second light polarizing elements extending radially from said analyzer point and respectively having radial axes and polarizing light planes respectively normal thereto, said second light polarizing elements being respectively aligned with the associated first light polarizing elements.

14. In the polariscope of claim 13, wherein each of said polarizer sections and each of said analyzer sections has a central portion inducing circular polarization.

15. In the polariscope of claim 13, wherein each of said polarizer sections and each of said analyzer sections is hexagonal in outline.

16. In the polariscope of claim 13, wherein each of said first light polarizing elements is tapered toward the center of the associated polarizer section, and each of said second light polarizing elements is tapered toward the center of the associated analyzer section.

17. In the polariscope of claim 13, wherein each of said sections is surrounded by an opaque region.

18. In the polariscope of claim 13, wherein each of said polarizer sections further includes a number of first light filtering means equal to the number of first light polarizing elements, said first light filter means having a plurality of filtering wavelengths and being aligned with said first light polarizing element, each of said analyzer sections including a number of second light filtering means equal in number to the number of said second light polarizing elements, said second light filtering means having said plurality of wavelengths and being aligned with said second light polarizing elements.

19. In a reflection polariscope for analyzing the stress in a specimen, comprising a polarizer for location adjacent to one side of the specimen and being divided into a multiplicity of sections and having a predetermined point, each of said sections including a number of elongated light polarizing elements extending radially from said point and having radial axes and inducing polarization at an angle of 45° thereto.

20. In the polariscope of claim 19, wherein each of said polarizer sections has a central portion inducing circular polarization.

21. In the polariscope of claim 19, wherein each of said polarizer sections is hexagonal in outline.

22. In the polariscope of claim 19, wherein each of said light polarizing elements is tapered toward the center of said section.

23. In the polariscope of claim 19, wherein each of said sections is surrounded by an opaque region.

24. In the polariscope of claim 19, wherein each of said sections further includes a corresponding number of light filtering means having a plurality of filtering wavelengths and being aligned with said light polarizing elements.

25. In the polariscope of claim 19, wherein at least two filtering wavelengths are provided, and no adjacent pair of light filtering means has the same filtering wavelength.

26. In a reflection polariscope for analyzing the stress in a specimen, comprising a slab of photoelastic material, a first polarizer on one side of said slab and being divided into a multiplicity of first polarizer sections and having a predetermined first polarizer point, each of said first polarizer sections including a number of elongated first light polarizing elements extending radially from said first polarizer point and respectively having radially directed axes and polarizing light therealong, a second polarizer bonded to the other side of said slab and being divided into a corresponding multiplicity of second polarizer sections and having a predetermined second polarizer point, each of said second polarizer sections including a corresponding number of elongated second light polarizing elements extending radially from said second polarizer point, respectively having radial axes and polarizing light in directions substantially normal thereto, said second light polarizing elements being respectively aligned with the associated first light polarizing elements.

27. The combination of claim 26, and further comprising reflecting means bonded to said second polarizer.

28. In the polariscope of claim 26, wherein each of said polarizer sections further includes a number of first light filtering means equal to the number of first light polarizing elements, said first light filter means having a plurality of filtering wavelengths and being aligned with said first light polarizing element, each of said analyzer sections including a number of second light filtering means equal in number to the number of said second light polarizing elements, said second light filtering means having said plurality of wavelengths and being aligned with said second light polarizing elements.

29. The combination of claim 28, and further comprising reflecting means bonded to said second polarizer.

* * * * *